(12) United States Patent
Huo et al.

(10) Patent No.: US 11,095,127 B2
(45) Date of Patent: Aug. 17, 2021

(54) METHOD FOR REAL-TIME SCHEDULING OF MULTI-ENERGY COMPLEMENTARY MICRO-GRIDS BASED ON ROLLOUT ALGORITHM

(71) Applicants: STATE GRID TIANJIN ELECTRIC POWER COMPANY, Tianjin (CN); STATE GRID CORPORATION OF CHINA, Beijing (CN); SOUTHEAST UNIVERSITY, Nanjing (CN)

(72) Inventors: Xianxu Huo, Tianjin (CN); Ling Jiang, Tianjin (CN); Honglei Zhao, Tianjin (CN); Baoguo Zhao, Tianjin (CN); Xudong Wang, Tianjin (CN); Guodong Li, Tianjin (CN); Tianchun Xiang, Tianjin (CN); Ke Xu, Tianjin (CN); Yan Qi, Tianjin (CN); Lei Wu, Tianjin (CN); Shiqian Ma, Tianjin (CN); Jingjing Yan, Tianjin (CN); Kai Wang, Nanjing (CN); Qingshan Xu, Nanjing (CN); Lu Sun, Nanjing (CN); Aidong Zeng, Nanjing (CN)

( * ) Notice: Subject to any disclaimer, the term of this patent is extended or adjusted under 35 U.S.C. 154(b) by 103 days.

(21) Appl. No.: 16/488,059

(22) PCT Filed: Nov. 8, 2017

(86) PCT No.: PCT/CN2017/109862
§ 371 (c)(1),
(2) Date: Aug. 22, 2019

(87) PCT Pub. No.: WO2018/171210
PCT Pub. Date: Sep. 27, 2018

(65) Prior Publication Data
US 2020/0185926 A1    Jun. 11, 2020

(30) Foreign Application Priority Data
Mar. 21, 2017    (CN) .......................... 201710168834.7

(51) Int. Cl.
*H02J 3/46*    (2006.01)
*H02J 3/32*    (2006.01)
*H02J 7/00*    (2006.01)

(52) U.S. Cl.
CPC .................... *H02J 3/46* (2013.01); *H02J 3/32* (2013.01); *H02J 7/0068* (2013.01); *G05B 2219/2639* (2013.01); *H02J 2203/20* (2020.01)

(58) Field of Classification Search
CPC .... H02J 3/46; H02J 3/32; H02J 7/0068; H02J 2203/20; H02J 2300/28; H02J 3/00;
(Continued)

(56) References Cited

U.S. PATENT DOCUMENTS 9,484,747 B1* 11/2016 Avritzer .................... H02J 4/00
2012/0054139 A1* 3/2012 Nikovski ........... G06Q 10/0631
706/46

(Continued)

FOREIGN PATENT DOCUMENTS

CN    105811397    7/2016
CN    106410861    2/2017

(Continued)

OTHER PUBLICATIONS

Yu Lan, Rollout Strategies for real-time multi-energy scheduling in microgrid with storage system, Feb. 18, 2016, IET Journals, vol. 10, Issue.3, pp. 688-696, ISSN 1751-8687 (Year: 2016).*
(Continued)

*Primary Examiner* — Thomas C Lee
*Assistant Examiner* — Anzuman Sharmin
(74) *Attorney, Agent, or Firm* — Erson IP (Nelson IP)

(57) ABSTRACT

The invention relates to a method for real-time scheduling of multi-energy complementary micro-grids based on a Rollout algorithm, which is technically characterized by comprising the following steps of: Step 1, setting up a moving-horizon
(Continued)

setting up a moving-horizon Markov decision process model for the real-time scheduling of the multi-energy complementary micro-grids, and establishing constraint conditions for the real-time scheduling; — S101 establishing a target function of the real-time scheduling For the moving-horizon Markov decision process model for the real-time scheduling of the multi-energy complementary micro-grids; — S102 dividing a single complete scheduling cycle into a plurality of scheduling intervals, and finding one basic feasible solution meeting the constraint conditions for the real-time scheduling based on a greedy algorithm; — S103 finding a solution to the moving-horizon Markov decision process model for the real-tiMe scheduling of the multi-energy complementary micro-grids by using the Rollout algorithm based on the basic feasible solution. — S104

Markov decision process model for the real-time scheduling of the multi-energy complementary micro-grids with random new-energy outputs, and establishing constraint conditions for the real-time scheduling; Step 2, establishing a target function of the real-time scheduling; Step 3, dividing a single complete scheduling cycle into a plurality of scheduling intervals, and finding one basic feasible solution meeting the constraint conditions for the real-time scheduling based on a greedy algorithm; and Step 4, finding a solution to the moving-horizon Markov decision process model for the real-time scheduling of the multi-energy complementary micro-grids by using the Rollout algorithm based on the basic feasible solution from Step 3. With the consideration of the fluctuations in the new-energy outputs, the present invention solves the problems of low speed and low efficiency of a traditional algorithm at the same time, enabling high-speed efficient multi-energy complementary micro-grid real-time scheduling.

5 Claims, 1 Drawing Sheet

(58) Field of Classification Search
CPC . G05B 2219/2639; Y02E 60/00; Y02E 40/70; Y04S 40/20; Y04S 10/50; Y02P 80/14
See application file for complete search history.

(56) References Cited

U.S. PATENT DOCUMENTS

2014/0249882 A1* 9/2014 Li .................... G06Q 10/06313
705/7.23
2015/0323391 A1* 11/2015 McCulloch ........ G01N 33/0004
374/185

FOREIGN PATENT DOCUMENTS

| | | |
|---|---|---|
| CN | 106410966 | 2/2017 |
| CN | 106849190 | 6/2017 |
| JP | 2016042775 | 3/2016 |

OTHER PUBLICATIONS

Lv et al., "Optimization of Energy Management in Multi-region Microgrid", Proceedings of the 34th Chinese Control Conference, Jul. 28-30, 2015, Hangzhou, China; pp. 8920-8925. (English Abstract is on p. 8920.).

International search report dated Jan. 26, 2018 from corresponding application No. PCT/CN2017/109862.

* cited by examiner

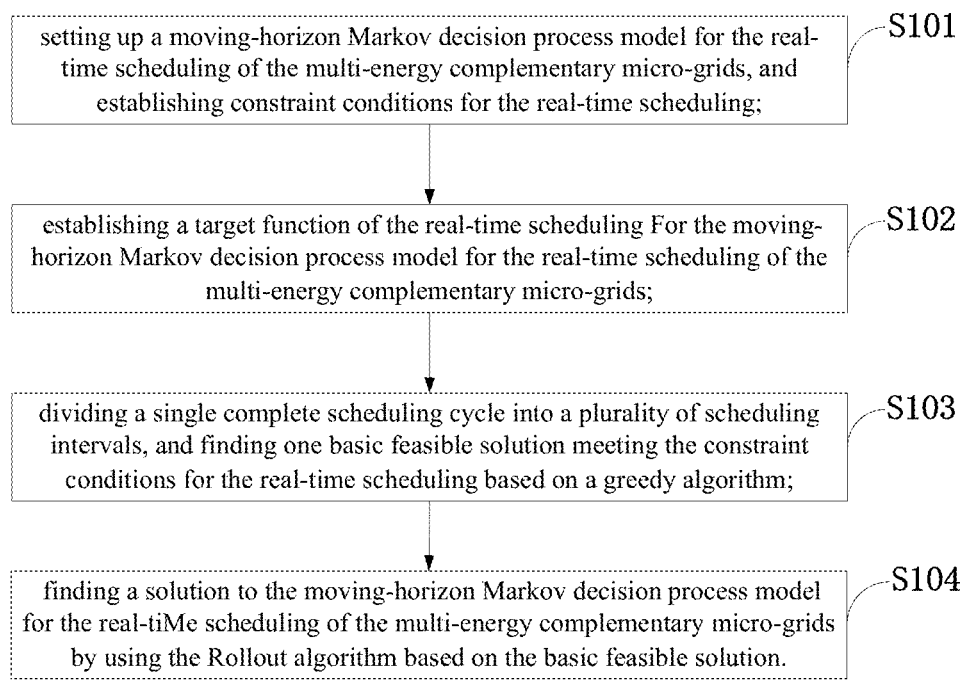

… (US 11,095,127 B2)

METHOD FOR REAL-TIME SCHEDULING OF MULTI-ENERGY COMPLEMENTARY MICRO-GRIDS BASED ON ROLLOUT ALGORITHM

RELATED APPLICATIONS

The present application is a National Phase of International Application Number PCT/CN2017/109862, filed Nov. 8, 2017, and claims the priority of China Application No. 201710168834.7, filed Mar. 21, 2017.

TECHNICAL FIELD

The invention generally belongs to the technical field of multi-energy complementary micro-grids, and relates to a method for real-time scheduling of multi-energy complementary micro-grids, and in particular to a method for real-time scheduling of multi-energy complementary micro-grids based on a Rollout algorithm

BACKGROUND

As the smart grid technology evolves, a multi-energy complementary micro-grid system incorporating new energies with an energy storage feature has aroused widespread concerns from researchers. As an autonomous system capable of self-control, protection and management, the multi-energy complementary micro-grids can facilitate the utilization of distributed energy on the spot and enable highly reliable supply of various forms of energy loaded in a more economic and friendly way, transitioning from the traditional grid to the smart grid.

The fluctuation and intermittence in the new-energy outputs pose great challenges to the real-time scheduling of the multi-energy complementary micro-grids, and since the real-time scheduling is a moving-horizon process, the control behavior in a current scheduling interval not only affects the current cycle but also affects the state of a next scheduling interval. The Markov decision model provides a good idea to solve this moving scheduling problem with uncertain variables, but the large number of variables brings a disaster on dimension, leading to a difficulty in finding a solution to the model, and how to find an effective method to solve the difficulty above has become the key to real-time scheduling.

SUMMARY OF THE INVENTION

An objective of the present invention is to overcome the deficiencies of the prior art, and to provide a method for real-time scheduling of multi-energy complementary micro-grids based on a Rollout algorithm, which is simple, feasible, efficient and rapid with reasonable design and high practicability.

The invention solves the technical problem with the following technical solution:
a method for real-time scheduling of multi-energy complementary micro-grids based on a Rollout algorithm, characterized by comprising the following steps of:
Step 1, setting up a moving-horizon Markov decision process model for the real-time scheduling of the multi-energy complementary micro-grids with random new-energy outputs, and establishing constraint conditions for the real-time scheduling;
Step 2, establishing a target function of the real-time scheduling for the moving-horizon Markov decision process model for the real-time scheduling of the multi-energy complementary micro-grids with random new-energy outputs, with the goal of minimum operating cost of a micro-grid system in a moving-horizon Markov decision cycle;
Step 3, dividing a single complete scheduling cycle into a plurality of scheduling intervals, and finding one basic feasible solution meeting the constraint conditions for the real-time scheduling based on a greedy algorithm; and
Step 4, finding a solution to the moving-horizon Markov decision process model for the real-time scheduling of the multi-energy complementary micro-grids by using the Rollout algorithm based on the basic feasible solution from Step 3.

Furthermore, the constraint conditions established for the real-time scheduling in Step 1 comprise: micro-grid electric equilibrium constraints, storage battery operating constraints, exchange electric power constraints for the micro-grids and a main grid, and electric power output constraints for combined heat and power equipment;
the micro-grid electric equilibrium constraints are as follows:

$$p^G(t) + \sum_{i=1}^{N} p_i^c(t) + p^B(t) + p^w(t) = p^D(t)$$

in the formula, t is a time parameter; $p^G(t)$ is exchange electric power for the micro-grids and the main grid at a time t, which is positive during the purchasing of electricity from the main grid and negative during selling of electricity to the main grid; N is the quantity of the combined heat and power equipment; $p_i^c(t)$ is the output electric power of the i th combined heat and power equipment at the time t; $p^B(t)$ is charging/discharging power of the storage battery at the time t, which is negative during charging and positive during discharging; $p^w(t)$ is generated output of wind power at the time t; and $p^D(t)$ is an electric load demand at the time t;
the storage battery operating constraints are as follows:

$$\begin{cases} E(t+1) = E(t) = p^B(t) \cdot \Delta T \cdot \alpha_c \\ E(t+1) = E(t) - p^B(t) \cdot \Delta T/\alpha_d \\ \underline{E} \le E(t) \le \overline{E} \\ |p^B(t)| \le \overline{p^B} \end{cases}$$

in the formulae, E(t) and E(t+1) are energy storage levels of the storage battery at the time t and a time t+1 respectively; $\underline{E}$ and $\overline{E}$ are upper and lower boundaries of the capacity of the storage battery respectively; $\Delta T$ is a time interval from the time t to the time t+1; $\alpha_c$ and $\alpha_d$ are charging and discharging efficiencies of the storage battery respectively; $p^B(t)$ is charging/discharging power of the storage battery at the time t, which is negative during charging and positive during discharging; and $\overline{p^B}$ is an upper limit value of the charging/discharging power of the storage battery;
the exchange electric power constraints for the micro-grids and the main grid are as follows:

$$\begin{cases} |p^G(t)| \le \overline{p^G} \\ |p^G(t) - p^G(t-1)| \le \delta \end{cases}$$

in the formulae, $p^G(t)$ and $p^G(t-1)$ are exchange electric power between the micro-grids and the main grid at the times t and t−1 respectively, which is positive during purchasing of electricity from the main grid and negative during selling of electricity to the main grid; $\overline{p^G}$ is an upper limit value of the exchange electric power between the micro-grids and the main grid, and δ is an upper fluctuation limit of the exchange electric power between the micro-grids and the main grid;

the electric power output constraints for the combined heat and power equipment are as follows:

$$\begin{cases} 0 \le p_i^c(t) \le \overline{p_i^c}, i = 1, 2, \ldots, N \\ \underline{v_i} \cdot H_i(t) \le p_i^c(t) \le \overline{v_i} \cdot H_i(t) \end{cases}$$

in the formulae, $p_i^c(t)$ is output electric power of the ith combined heat and power equipment at the time t; $\overline{p_i^c}$ is an upper limit of the output electric power of the ith combined heat and power equipment; $H_i(t)$ is thermal power required to be supplied by the ith combined heat and power equipment at the time t; $\underline{v_i}$ and $\overline{v_i}$ are lower and upper limits of electric-thermal power conversion efficiency of the ith combined heat and power equipment.

Furthermore, establishing a target function of the real-time scheduling for the moving-horizon Markov decision process model for the real-time scheduling of the multi-energy complementary micro-grids with random new-energy outputs in Step 2 specifically comprises the following sub-steps of: first setting up an operating cost function of the micro-grid system at a single scheduling interval with the goal of minimum operating cost of the micro-grid system at the single scheduling interval, and then establishing a target function of the real-time scheduling with the goal of the minimum operating cost of the micro-grid system in the moving-horizon Markov decision cycle;

the operating cost function of the micro-grid system at the single scheduling interval is as follows:

$$c_t(X(t), A(t)) = \lambda(t) \cdot p^G(t) \cdot \Delta T + c \cdot \sum_{i=1}^{N} F_i^c(t)$$

wherein $$\begin{cases} F_i^c(t) = a_i \cdot p_i^c(t) + b_i \\ X(t) = [E(t), p^G(t-1), p^w(t)] \\ A(t) = [p_i^c(t), p^G(t), p^B(t)] \end{cases}$$

in the formulae, X(t) is a state variable of the micro-grid system at the time t; A(t) is a control variable of the micro-grid system at the time t; $c_t(X(t),A(t))$ is a function of the system operating cost at the single scheduling interval; λ(t) is a grid electricity price at the time t; c is a price of natural gas; $F_i^c(t)$ is a linear function between a gas consumption and an electric output of the ith combined heat and power equipment; and $a_i$ and $b_i$ are coefficients of the linear function between the gas consumption and the electric output of the ith combined heat and power equipment;

the target function of the real-time scheduling is as follows:

$$\min J_t(X(t), A(t)) = c_t(X(t), A(t)) + E\left[\sum_{t_1=t+1}^{t+T-1} c_{t_1}(X(t_1), A(t_1))\right]$$

in the formula, $J_t(X(t),A(t))$ is a function of the operating cost of the micro-grid system in the moving-horizon Markov decision cycle;

Furthermore, Step 3 specifically comprises the following sub-steps of: dividing a complete scheduling cycle into a plurality of scheduling intervals, finding a solution specific to a scheduling optimization problem in each of the scheduling intervals based on the greedy algorithm respectively, and finally synthesizing locally optimal solutions to respective scheduling intervals into one basic feasible solution across the complete scheduling interval.

Furthermore, the finding a solution specific to a scheduling optimization problem in each of the scheduling intervals based on the greedy algorithm respectively in Step 3 specifically comprises the following sub-steps of:

(1) according to the operating cost function of the micro-grid system in a single scheduling interval in Step 2, listing the target function and the constraint conditions as follows:

$$\min c_t(X(t), A(t)) = \lambda(t) \cdot p^G(t) \cdot \Delta T + \sum_{i=1}^{N} c \cdot a_i \cdot p_i^c(t) + \sum_{i=1}^{N} b_i$$

the constraint conditions are as follows:

$$\begin{cases} p^G(t) + \sum_{i=1}^{N} p_i^c(t) + p^B(t) + p^w(t) = p^D(t) \\ \underline{pb}(t) \le p^B(t) \le \overline{pb}(t) \\ \underline{pg}(t) \le p^G(t) \le \overline{pg}(t) \\ \underline{pc_i}(t) \le p_i^c(t) \le \overline{pc_i}(t) \ i = 1, 2, \ldots, N \end{cases}$$

Wherein $$\begin{cases} \underline{pb}(t) = \max\{(E(t) - \overline{E})/(\Delta T \cdot \alpha_c), -\overline{p^B}\} \\ \overline{pb}(t) = \min\{(E(t) - \underline{E}) \cdot \alpha_d/\Delta T, \overline{p^B}\} \\ \underline{pg}(t) = \max\{\underline{p^G}, p^G(t-1) - \delta\} \\ \overline{pg}(t) = \min\{\overline{p^G}, p^G(t-1) + \delta\} \\ \underline{pc_i}(t) = \max\{0, \underline{v_i} \cdot H_i(t)\} \\ \overline{pc_i}(t) = \min\{\overline{p_i^c}, \overline{v_i} \cdot H_i(t)\} \end{cases}$$

in the formulae, $\underline{pb}(t)$ and $\overline{pb}(t)$ are new lower and upper limits of the charging/discharging power of the storage battery during building of the basic feasible solution respectively; $\underline{pg}(t)$ and $\overline{pg}(t)$ are new lower and upper limits of the exchange power between the micro-grid and main grid during the building of the basic feasible solution respectively; $\underline{pc_i}(t)$ and $\overline{pc_i}(t)$ are new lower and upper limits of the electric output of the ith combined heat and power equipment during the building of the basic feasible solution respectively;

(2) to obtain an optimized result in one of the scheduling intervals, ranking N+2 coefficients of the target function in an ascending order to obtain a scheduling sequence for respective decision variables, wherein the N+2 coefficients are $\lambda(t) \cdot \Delta T$, 0, $c \cdot a_i$ (i=1, 2, . . . N), and the presence of the coefficient 0 is because the target function does not comprise $p^B(t)$; then forcing a load difference to be $d(t) = p^D(t) - p^w(t)$; and finding a final optimized result according to the value of d(t) and the scheduling sequence of respective decision variables; and (3) finding solutions for other scheduling intervals in turn to obtain one basic feasible solution meeting the micro-grid operating demand finally.

Furthermore, Step 4 specifically comprises the following sub-steps of:

(1) supposing the basic feasible solution obtained from Step 3 to be $\pi_b = (A_{b,t+1}, A_{b,t+2}, \ldots, A_{b,t+T-1})$ to obtain an approximate value of the target function for the minimum operating cost from the time t to the time t+T −1 during one real-time scheduling:

$$\overline{J}_t(X(t), A(t)) = c_t(X(t), A(t)) + E\left[\sum_{t_1=t+1}^{t+T-1} c_{t_1}(X(t_1), A_{b,t_1})\right]$$

in the formula, $\overline{J}_t(X(t), A(t))$ is a function of the operating cost of the micro-grid system in the moving-horizon Marcov decision cycle as solved with the Rollout algorithm (2) forcing the approximate value to approach the minimum with the Rollout algorithm:

$$\overline{a}_t = \arg\min_{A(t)} \overline{J}_t(X(t), A(t))$$

(3) according to X(t) in one of the current scheduling intervals and in combination with a generated output value of wind power at the time t, finding X(t+1) in a next scheduling interval, finding the generated output value of the wind power at the time t+1 at the same time, then calculating X(t+2) in the next scheduling interval, and repeating the process until the whole scheduling cycle ends.

The present invention has the following advantages and positive effects:

1. The present invention provides the method for real-time scheduling of multi-energy complementary micro-grids based on the Rollout algorithm, where at first, the moving-horizon Markov decision process model for multi-energy complementary micro-grid real-time scheduling is set up, and the constraint conditions for the real-time scheduling are established; then, a complete scheduling cycle is divided into a plurality of scheduling intervals, and one basic feasible solution meeting the constraint conditions for the real-time scheduling is found based on the greedy algorithm; and finally, a problem on the moving-horizon Markov decision for the multi-energy complementary micro-grids is solved by using the Rollout algorithm based on the basic feasible solution above. With the setup of the moving-horizon model for the multi-energy complementary micro-grids, the present invention finds the solution by using the Rollout algorithm, which is simple and effective with high practicability.

2. The present invention finds the solution to the problem on the moving-horizon Markov decision model by using the Rollout algorithm, where a Markov decision model incorporating random new-energy outputs is set up at first, one basic feasible solution is found with the greedy algorithm, and the goal is approached based on this with the consideration of the fluctuations in the new-energy output, and the problems of low speed and efficiency of the traditional algorithm are solved at the same time, enabling high-speed efficient real-time scheduling for the multi-energy complementary micro-grids.

BRIEF DESCRIPTION OF THE DRAWINGS

FIG. 1 shows a process flow diagram of the present invention.

DETAILED DESCRIPTION

The embodiments of the present invention are further described in detail below with reference to the accompanying drawings:

The present invention provides a method for real-time scheduling of multi-energy complementary micro-grids based on the Rollout algorithm, which not only takes the fluctuations in the new energy outputs into consideration, but also more effectively solves the problem on the moving-horizon scheduling of the multi-energy complementary micro-grids, solving the problem on the moving-horizon Marcov decision model with the Rollout algorithm. According to the method, at first, the moving-horizon Markov decision process model for multi-energy complementary micro-grid real-time scheduling with random new-energy output is set up, and the constraint conditions and the target function for the real-time scheduling are established; then, a complete scheduling cycle is divided into a plurality of scheduling intervals, and one basic feasible solution meeting the constraint conditions for the real-time scheduling is found based on the greedy algorithm; and finally, a solution to the moving-horizon Markov decision model for multi-energy complementary micro-grids is found by using the Rollout algorithm based on the basic feasible solution above.

A method for real-time scheduling of multi-energy complementary micro-grids based on a Rollout algorithm, as shown in FIG. 1, comprises the following steps of:

Step 1, setting up a moving-horizon Markov decision process model for the real-time scheduling of the multi-energy complementary micro-grids with random new-energy outputs, and establishing constraint conditions for the real-time scheduling;

where the constraint conditions established for the real-time scheduling in Step 1 comprises: micro-grid electric equilibrium constraints, storage battery operating constraints, exchange electric power constraints for the micro-grids and a main grid, and electric power output constraints for combined heat and power equipment;

the micro-grid electric equilibrium constraints are as follows:

$$p^G(t) + \sum_{i=1}^{N} p_i^c(t) + p^B(t) + p^w(t) = p^D(t)$$

in the formula, t is a time parameter; $p^G(t)$ is exchange electric power for the micro-grids and the main grid at a time t, which is positive during purchasing of electricity from the main grid and negative during selling of electricity to the main grid; N is the quantity of the combined heat and power equipment; $p_i^c(t)$ is output electric power of the ith combined heat and power equipment at the time t; $p^B(1)$ is charging/discharging power of the storage battery at the time t, which is negative during charging and positive during discharging; $p^w(t)$ is generated output of wind power at the time t; and $p^D(t)$ is an electric load demand at the time t;

the storage battery operating constraints are as follows:

$$\begin{cases} E(t+1) = E(t) - p^B(t) \cdot \Delta T \cdot \alpha_c \\ E(t+1) = E(t) - p^B(t) \cdot \Delta T / \alpha_d \\ \underline{E} \leq E(t) \leq \overline{E} \\ |p^B(t)| \leq \overline{p^B} \end{cases}$$

in the formulae, E(t) and E(t+1) are energy storage levels of the storage battery at the time t and a time t+1 respectively; $\underline{E}$ and $\overline{E}$ are upper and lower boundaries of the capacity of the storage battery respectively; $\Delta T$ is a time interval from the time t to the time t+1; $a_c$ and $a_d$ are charging and discharging efficiencies of the storage battery respectively; $p^B(t)$ is charging/discharging power of the storage battery at the time t, which is negative during charging and positive during discharging; and $\overline{p^B}$ is an upper limit value of the charging/discharging power of the storage battery;

the exchange electric power constraints for the micro-grids and the main grid are as follows:

$$\begin{cases} |p^G(t)| \leq \overline{p^G} \\ |p^G(t) - p^G(t-1)| \leq \delta \end{cases}$$

in the formulae, $p^G(t)$ and $p^G(t-1)$ are exchange electric power between the micro-grids and the main grid at the times t and t−1 respectively, which is positive during purchasing of electricity from the main grid and negative during selling of electricity to the main grid; $\overline{p^G}$ is an upper limit value of the exchange electric power between the micro-grids and the main grid, and $\delta$ is an upper fluctuation limit of the exchange electric power between the micro-grids and the main grid;

the electric power output constraints for the combined heat and power equipment are as follows:

$$\begin{cases} 0 \leq p_i^c(t) \leq \overline{p_i^c}, i = 1, 2, \ldots, N \\ \underline{v_i} \cdot H_i(t) \leq p_i^c(t) \leq \overline{v_i} \cdot H_i(t) \end{cases}$$

in the formulae, $p_i^c(t)$ is output electric power of the ith combined heat and power equipment at the time t; $\overline{p_i^c}$ is an upper limit of the output electric power of the ith combined heat and power equipment; $H_i(t)$ is thermal power required to be supplied by the ith combined heat and power equipment at the time t; $\underline{v_i}$ and $\overline{v_i}$ are lower and upper limits of electric-thermal power conversion efficiency of the ith combined heat and power equipment.

Step 2, establishing a target function of the real-time scheduling for the moving-horizon Markov decision process model for the real-time scheduling of the multi-energy complementary micro-grids with random new-energy outputs, with the goal of minimum operating cost of a micro-grid system in a moving-horizon Markov decision cycle; wherein when in a grid-connected state with the main grid, the multi-energy complementary micro-grids can exchange electricity with the main grid, with energy supply equipment comprising wind driven generators, combined heat and power (CHP) equipment, and storage batteries; and the target function of real-time scheduling is to achieve the minimum operating cost, including system electricity purchasing cost and fuel cost of the CHP equipment, for the micro-grid system.

the establishing a target function of the real-time scheduling for the moving-horizon Markov decision process model for the real-time scheduling of the multi-energy complementary micro-grids with random new-energy outputs specifically comprises the following sub-steps of: first setting up an operating cost function of the micro-grid system at a single scheduling interval with the goal of minimum operating cost of the micro-grid system at the single scheduling interval, and then establishing a target function of the real-time scheduling with the goal of the minimum operating cost of the micro-grid system in the moving-horizon Markov decision cycle;

the operating cost function of the micro-grid system at the single scheduling interval is as follows:

$$c_t(X(t), A(t)) = \lambda(t) \cdot p^G(t) \cdot \Delta T + c \cdot \sum_{i=1}^{N} F_i^c(t)$$

Wherein $$\begin{cases} F_i^c(t) = a_i \cdot p_i^c(t) + b_i \\ X(t) = [E(t), p^G(t-1), p^w(t)] \\ A(t) = [p_i^c(t), p^G(t), p^B(t)] \end{cases}$$

in the formulae, X(t) is a state variable of the micro-grid system at the time t; A(t) is a control variable of the micro-grid system at the time t; $c_t(X(t),A(t))$ is a function of system operating cost at the single scheduling interval; $\lambda(t)$ is a grid electricity price at the time t; c is a price of natural gas; $F_i^c(t)$ is a linear function between a gas consumption and an electric output of the ith combined heat and power equipment; and $a_i$ and $b_i$ are coefficients of the linear function between the gas consumption and the electric output of the ith combined heat and power equipment;

the target function of the real-time scheduling is as follows:

$$\min J_t(X(t), A(t)) = c_t(X(t), A(t)) + E\left[\sum_{t_1=t+1}^{t+T-1} c_{t_1}(X(t_1), A(t_1))\right]$$

in the formula, $J_t(X(t),A(t))$ is a function of the operating cost of the micro-grid system in the moving-horizon Markov decision cycle;

Step 3, dividing a single complete scheduling cycle into a plurality of scheduling intervals, and finding one basic feasible solution meeting the constraint conditions for the real-time scheduling based on a greedy algorithm;

where Step 3 specifically comprises the following sub-steps of: dividing a complete scheduling cycle into a plurality of scheduling intervals, finding a solution specific to a scheduling optimization problem in each of the scheduling intervals based on the greedy algorithm respectively, and finally synthesizing locally optimal solutions to respective scheduling intervals into one basic feasible solution across the complete scheduling interval.

the finding a solution specific to a scheduling optimization problem in each of the scheduling intervals based on the greedy algorithm respectively in Step 3 specifically comprises the following sub-steps of:

(1) according to the operating cost function of the micro-grid system in a single scheduling interval in Step 2, listing the target function and the constraint conditions as follows:

$$\min c_t(X(t), A(t)) = \lambda(t) \cdot p^G(t) \cdot \Delta T + \sum_{i=1}^{N} c \cdot a_i \cdot p_i^c(t) + \sum_{i=1}^{N} b_i$$

the constraint conditions are as follows:

$$\begin{cases} p^G(t) + \sum_{i=1}^{N} p_i^c(t) + p^B(t) + p^w(t) = p^D(t) \\ \underline{pb}(t) \le p^B(t) \le \overline{pb}(t) \\ \underline{pg}(t) \le p^G(t) \le \overline{pg}(t) \\ \underline{pc_i}(t) \le p_i^c(t) \le \overline{pc_i}(t) \ i = 1, 2, \ldots, N \end{cases}$$

wherein $$\begin{cases} \underline{pb}(t) = \max\{(E(t) - \overline{E})/(\Delta T \cdot \alpha_c), -\overline{p^B}\} \\ \overline{pb}(t) = \min\{(E(t) - \underline{E}) \cdot \alpha_d/\Delta T, \overline{p^B}\} \\ \underline{pg}(t) = \max\{\underline{p^G}, p^G(t-1) - \delta\} \\ \overline{pg}(t) = \min\{\overline{p^G}, p^G(t-1) + \delta\} \\ \underline{pc_i}(t) = \max\{0, \underline{v_i} \cdot H_i(t)\} \\ \overline{pc_i}(t) = \min\{\overline{p_i^c}, \overline{v_i} \cdot H_i(t)\} \end{cases}$$

in the formulae, $\underline{pb}$ (t) and $\overline{pb}$(t) are new lower and upper limits of the charging/discharging power of the storage battery during building of the basic feasible solution respectively; $\underline{pg}(t)$ and $\overline{pg}(t)$ are new lower and upper limits of the exchange power between the micro-grid and main grid during the building of the basic feasible solution respectively; $\underline{pc_i}$ (t) and $\overline{pc_i}$ (t) are new lower and upper limits of the electric output of the ith combined heat and power equipment during the building of the basic feasible solution respectively;

(2) to obtain an optimized result in one of the scheduling intervals, ranking N+2 coefficients of the target function in an ascending order to obtain a scheduling sequence for respective decision variables, wherein the N+2 coefficients are $\lambda(t) \cdot \Delta T$, 0, $c \cdot a_i$ (i=1, 2, ..., N), the presence of the coefficient 0 is because the target function does not comprise $p^B$ (t); then forcing a load difference to be $d(t)=p^D(t)-p^w(t)$; and finding a final optimized result according to the value of d(t) and the scheduling sequence of respective decision variables; and (3) finding solutions for other scheduling intervals in turn to obtain one basic feasible solution meeting the micro-grid operating demand finally.

Step 4, finding a solution to the moving-horizon Markov decision process model for the real-time scheduling of the multi-energy complementary micro-grids by using the Rollout algorithm based on the basic feasible solution from Step 3.

Step 4 specifically comprises the following sub-steps of:
(1) supposing the basic feasible solution obtained from Step 3 to be $\pi_b = (A_{b,t+1}, A_{b,t+2}, \ldots, A_{b,t+T-1})$ to obtain an approximate value of the target function for the minimum operating cost from the time t to the time t+T-1 during one real-time scheduling:

$$\overline{J}_t(X(t), A(t)) = c_t(X(t), A(t)) + E\left[\sum_{t_1=t+1}^{t+T-1} c_{t_1}(X(t_1), A_{b,t_1})\right]$$

in the formula, $\overline{J}_t$ (X(t),A(t)) is a function of the operating cost of the micro-grid system in the moving-horizon Marcov decision cycle as solved with the Rollout algorithm (2) forcing the approximate value to approach the minimum with the Rollout algorithm:

$$\overline{a_t} = \arg\min_{A(t)} \overline{J}_t(X(t), A(t))$$

(3) according to X(t) in one of the current scheduling intervals and in combination with a generated output value of wind power at the time t, finding X (t+1) in a next scheduling interval, finding the generated output value of the wind power at the time t+1 at the same time, then calculating X(t+2) in the next scheduling interval, and repeating the process until the whole scheduling cycle ends.

It should be noted that the described embodiments of the present invention are for an illustrative purpose rather than a limiting purpose, and the present invention thus includes but not limited to the embodiments described in the Description of Preferred Embodiments. Any other embodiments obtained by those skilled in the art according to the technical solution of the present invention likewise fall within the protection scope of the present invention.

The invention claimed is:

1. A method for real-time scheduling of multi-energy complementary micro-grids based on a Rollout algorithm, characterized by comprising the following steps of:

Step 1, setting up a moving-horizon Markov decision process model for the real-time scheduling of the multi-energy complementary micro-grids with random new-energy outputs, and establishing constraint conditions for the real-time scheduling;

Step 2, establishing a target function of the real-time scheduling for the moving-horizon Markov decision process model for the real-time scheduling of the multi-energy complementary micro-grids with the random new-energy outputs, with the goal of minimum operating cost of a micro-grid system in a moving-horizon Markov decision cycle;

Step 3, dividing a single complete scheduling cycle into a plurality of scheduling intervals, and finding one basic feasible solution meeting the constraint conditions for the real-time scheduling based on a greedy algorithm; and Step 4, finding a solution to the moving-horizon Markov decision process model for the real-time scheduling of the multi-energy complementary micro-grids by using the Rollout algorithm based on the basic feasible solution from Step 3;

wherein the constraint conditions established for the real-time scheduling in Step 1 comprises:

micro-grid electric equilibrium constraints, storage battery operating constraints, exchange electric power constraints for the micro-grids and a main grid, and electric power output constraints for combined heat and power equipment;

the micro-grid electric equilibrium constraints are as follows:

$$p^G(t) + \sum_{i=1}^{N} p_i^c(t) + p^B(t) + p^w(t) = p^D(t)$$

in the formula, t is a time parameter; $p^G(t)$ is exchange electric power for the micro-grids and the main grid at a time t, which is positive during purchasing of electricity from the main grid and negative during selling of electricity to the main grid; N is the quantity of the combined heat and power equipment; $p_i^c(t)$ is output electric power of the i th combined heat and power equipment at the time t; $p^B(t)$ is charging/discharging power of the storage battery at the time t, which is negative during charging and positive during discharging; $p^w(t)$ is generated output of wind power at the time t; and $p^D(t)$ is an electric load demand at the time t;

the storage battery operating constraints are as follows:

$$\begin{cases} E(t+1) = E(t) - p^B(t) \cdot \Delta T \cdot \alpha_c \\ E(t+1) = E(t) - p^B(t) \cdot \Delta T/\alpha_d \\ \underline{E} \leq E(t) \leq \overline{E} \\ |p^B(t)| \leq \overline{p^B} \end{cases}$$

in the formulae, E(t) and E(t+1) are energy storage levels of the storage battery at the time t and a time t+1 respectively; $\overline{E}$ and $\underline{E}$ are upper and lower boundaries of the capacity of the storage battery respectively; $\Delta T$ is a time interval from the time t to the time t+1; $\alpha_c$ and $\alpha_d$ are charging and discharging efficiencies of the storage battery respectively; $p^B(t)$ is charging/discharging power of the storage battery at the time t, which is negative during charging and positive during discharging; and $\overline{p^B}$ is an upper limit value of the charging/discharging power of the storage battery;

the exchange electric power constraints for the micro-grids and the main grid are as follows:

$$\begin{cases} |p^G(t)| \leq \overline{p^G} \\ |p^G(t) - p^G(t-1)| \leq \delta \end{cases}$$

in the formulae, $p^G(t)$ and $p^G(t-1)$ are exchange electric power between the micro-grids and the main grid at the times t and t−1 respectively, which is positive during purchasing of electricity from the main grid and negative during selling of electricity to the main grid; $\overline{p^G}$ is an upper limit value of the exchange electric power between the micro-grids and the main grid, and $\delta$ is an upper fluctuation limit of the exchange electric power between the micro-grids and the main grid;

the electric power output constraints for the combined heat and power equipment are as follows:

$$\begin{cases} 0 \leq p_i^c(t) \leq \overline{p_i^c}, \quad i = 1, 2, \ldots, N \\ \underline{v_i} \cdot H_i(t) \leq p_i^c(t) \leq \overline{v_i} \cdot H_i(t) \end{cases}$$

in the formulae, $p_i^c(t)$ is output electric power of the i th combined heat and power equipment at the time t; $\overline{p_i^c}$ is an upper limit of the output electric power of the ith combined heat and power equipment $H_i(t)$ is thermal power required to be supplied by the ith combined heat and power equipment at the time t; $\underline{v_i}$ and $\overline{v_i}$ are lower and upper limits of electric-thermal power conversion efficiency of the ith combined heat and power equipment.

2. The method for real-time scheduling of multi-energy complementary micro-grids based on the Rollout algorithm according to claim 1, wherein the establishing a target function of the real-time scheduling for the moving-horizon Markov decision process model for the real-time scheduling of the multi-energy complementary micro-grids with random new-energy outputs in Step 2 specifically comprises the following sub-steps of: first setting up an operating cost function of the micro-grid system at a single scheduling interval with the goal of minimum operating cost of the micro-grid system at the single scheduling interval, and then establishing a target function of the real-time scheduling with the goal of the minimum operating cost of the micro-grid system in the moving-horizon Markov decision cycle;

the operating cost function of the micro-grid system at the single scheduling interval is as follows:

$$c_t(X(t), A(t)) = \lambda(t) \cdot p^G(t) \cdot \Delta T + c \cdot \sum_{i=1}^{N} F_i^c(t)$$

Wherein $$\begin{cases} F_i^c(t) = a_i \cdot p_i^c(t) + b_i \\ X(t) = [E(t), p^G(t-1), p^w(t)] \\ A(t) = [p_i^c(t), p^G(t), p^B(t)] \end{cases}$$

in the formulae, X(t) is a state variable of the micro-grid system at the time t; A(t) is a control variable of the micro-grid system at the time t; $c_t(X(t),A(t))$ is a function of system operating cost at the single scheduling interval; $\lambda(t)$ is a grid electricity price at the time t; c is a price of natural gas; $F_i^c(t)$ is a linear function between a gas consumption and an electric output of the i th combined heat and power equipment; and $a_i$ and $b_i$ are coefficients of the linear function between the gas consumption and the electric output of the i th combined heat and power equipment;

the target function of the real-time scheduling is as follows:

$$\min J_t(X(t), A(t)) = c_t(X(t), A(t)) + E\left[\sum_{t_1=t+1}^{t+T-1} c_{t_1}(X(t_1), A(t_1))\right]$$

in the formula, $J_t(X(t),A(t))$ is a function of the operating cost of the micro-grid system in the moving-horizon Markov decision cycle.

3. The method for real-time scheduling of multi-energy complementary micro-grids based on the Rollout algorithm according to claim 1, wherein Step 3 specifically comprises the following sub-steps of: dividing a complete scheduling cycle into a plurality of scheduling intervals, finding a solution specific to a scheduling optimization problem in each of the scheduling intervals based on the greedy algorithm respectively, and finally synthesizing locally optimal solutions to respective scheduling intervals into one basic feasible solution across the complete scheduling interval.

4. The method for real-time scheduling of multi-energy complementary micro-grids based on the Rollout algorithm according to claim 2, characterized in that the finding a solution specific to a scheduling optimization problem in each of the scheduling intervals based on the greedy algorithm respectively in Step 3 specifically comprises the following sub-steps of:

(1) according to the operating cost function of the micro-grid system in a single scheduling interval in Step 2, listing the target function and the constraint conditions as follows:

$$\min c_t(X(t), A(t)) = \lambda(t) \cdot p^G(t) \cdot \Delta T + \sum_{i=1}^{N} c \cdot a_i \cdot p_i^c(t) + \sum_{i=1}^{N} b_i$$

the constraint conditions are as follows:

$$\begin{cases} p^G(t) + \sum_{i=1}^{N} p_i^c(t) + p^B(t) + p^w(t) = p^D(t) \\ \underline{pb}(t) \le p^B(t) \le \overline{pb}(t) \\ \underline{pg}(t) \le p^G(t) \le \overline{pg}(t) \\ \underline{pc_i}(t) \le p_i^c(t) \le \overline{pc_i}(t) \ i = 1, 2, \ldots, N \end{cases}$$

wherein $$\begin{cases} \underline{pb}(t) = \max\{(E(t) - \overline{E})/(\Delta T \cdot \alpha_c), -\overline{p^B}\} \\ \overline{pb}(t) = \min\{(E(t) - \underline{E}) \cdot \alpha_d / \Delta T, \overline{p^B}\} \\ \underline{pg}(t) = \max\{\underline{p^G}, p^G(t-1) - \delta\} \\ \overline{pg}(t) = \min\{\overline{p^G}, p^G(t-1) + \delta\} \\ \underline{pc_i}(t) = \max\{0, v_i \cdot H_i(t)\} \\ \overline{pc_i}(t) = \min\{\overline{p_i^c}, \overline{v_i} \cdot H_i(t)\} \end{cases}$$

in the formulae, $\underline{pb}(t)$ and $\overline{pb}(t)$ are new lower and upper limits of the charging/discharging power of the storage battery during building of the basic feasible solution respectively; $\underline{pg}(t)$ and $\overline{pg}(t)$ are new lower and upper limits of the exchange power between the micro-grid and main grid during the building of the basic feasible solution respectively; $\underline{pc_i}(t)$ and $\overline{pc_i}(t)$ are new lower and upper limits of the electric output of the i th combined heat and power equipment during the building of the basic feasible solution respectively;

(2) to obtain an optimized result in one of the scheduling intervals, ranking N+2 coefficients of the target function in an ascending order to obtain a scheduling sequence for respective decision variables, wherein the N+2 coefficients are $\lambda(t) \cdot \Delta T$, 0, $c \cdot a_i$ (i=1, 2, . . . , N), and the presence of the coefficient 0 is because the target function does not comprise $p^B$; then forcing a load difference to be $d(t)=p^D(t)-p^w(t)$; and finding a final optimized result according to the value of $d(t)$ and the scheduling sequence of respective decision variables; and (3) finding solutions for other scheduling intervals in turn to obtain one basic feasible solution meeting the micro-grid operating demand finally.

5. The method for real-time scheduling of multi-energy complementary micro-grids based on the Rollout algorithm according to claim 1, wherein Step 4 specifically comprises the following sub-steps of:

(1) supposing the basic feasible solution obtained from Step 3 to be $\pi_b = (A_{b,t+1}, A_{b,t+2}, \ldots, A_{b,t+T-1})$ to obtain an approximate value of the target function for the minimum operating cost from the time t to the time t+T−1 during one real-time scheduling:

$$\overline{J}_t(X(t), A(t)) = c_t(X(t), A(t)) + E\left[\sum_{t_1=t+1}^{t+T-1} c_{t_1}(X(t_1), A_{b,t_1})\right]$$

in the formula, $\overline{J}(X(t),A(t))$ is a function of the operating cost of the micro-grid system in the moving-horizon Marcov decision cycle as solved with the Rollout algorithm;

(2) forcing the approximate value to approach the minimum with the Rollout algorithm:

$$\overline{a_t} = \arg\min_{A(t)} \overline{J}_t(X(t), A(t))$$

(3) according to X(t) in one of the current scheduling intervals and in combination with a generated output value of wind power at the time t, finding X(t+1) in a next scheduling interval, finding the generated output value of the wind power at the time t+1 at the same time, then calculating X(t+2) in the next scheduling interval, and repeating the process until the whole scheduling cycle ends.

* * * * *